Oct. 5, 1954 T. M. GLUYAS, JR 2,691,078

NEUTRALIZING CIRCUITS FOR HIGH-FREQUENCY AMPLIFIERS

Filed May 17, 1951 2 Sheets-Sheet 1

INVENTOR
Thomas M. Gluyas, Jr.
BY
Charles H. Brown
ATTORNEY

Oct. 5, 1954 T. M. GLUYAS, JR 2,691,078

NEUTRALIZING CIRCUITS FOR HIGH-FREQUENCY AMPLIFIERS

Filed May 17, 1951 2 Sheets-Sheet 2

INVENTOR
Thomas M. Gluyas, Jr.
BY
Charles H. Brown
ATTORNEY

Patented Oct. 5, 1954 2,691,078

UNITED STATES PATENT OFFICE 2,691,078

NEUTRALIZING CIRCUITS FOR HIGH-FREQUENCY AMPLIFIERS

Thomas M. Gluyas, Jr., Haddon Township, Camden County, N. J., assignor to Radio Corporation of America, a corporation of Delaware Application May 17, 1951, Serial No. 226,829

11 Claims. (Cl. 179—171)

This invention relates to amplifiers and more particularly to an improved circuit and apparatus for neutralizing amplifiers used at high frequencies.

Neutralization circuits are employed with high frequency power amplifiers for the purpose of eliminating feedback through the interelectrode capacities of the amplifier which can cause the amplifier to become unstable. In the case of grounded grid triode amplifiers and grounded cathode tetrode amplifiers, the presently known and used neutralization circuits are sufficiently effective only over a restricted bandwidth of operating frequencies. When the input and output circuits of these amplifiers are detuned somewhat, as occurs during the adjustment of a transmitter, the amplifier will often oscillate in parasitic fashion. Of course, a wide neutralization band is also desirable where an amplifier is sought to be used for wideband amplification such as in a television transmitter.

It is an object of this invention to provide an improved neutralizing circuit for high frequency amplifiers which provides neutralization over a wider band of frequencies than has been possible heretofore.

It is a further object of this invention to provide a novel and improved, wideband neutralizing circuit for high frequency grounded grid triode amplifiers and high frequency grounded cathode tetrode amplifiers.

These and further objects of the present invention are achieved by providing, in a high frequency multi-electrode amplifier of the triode or tetrode type, parallel connected capacitance and inductance between the two electrodes which serve as the respective input and output electrodes and series connected capacitance and inductance between one of the other electrodes and ground. In the triode, the input and output electrodes are respectively the cathode and anode, and the other electrode is the control grid. In the tetrode the input and output electrodes are respectively the control grid and anode, and the other electrode is the screen grid. The values of the parallel connected capacitance and inductance are selected to be resonant at a desired frequency of amplification and to provide a maximum surge impedance. This provides a high value of impedance at a designated frequency lower than the desired frequency at which a minimum interelectrode coupling is desired. The capacitor includes the capacitance between the electrodes to which it is connected. The values of the series connected capacitance and inductance are chosen to be series resonant at the desired frequency and in addition have their values selected to minimize input and output electrode coupling at another desired frequency.

Figure 1:
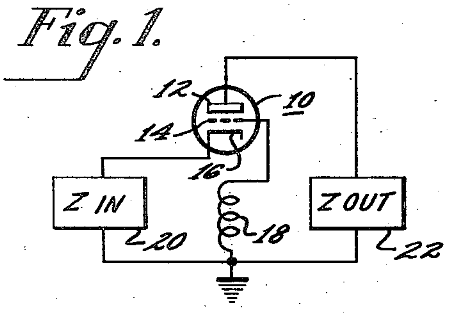
Figure 2:
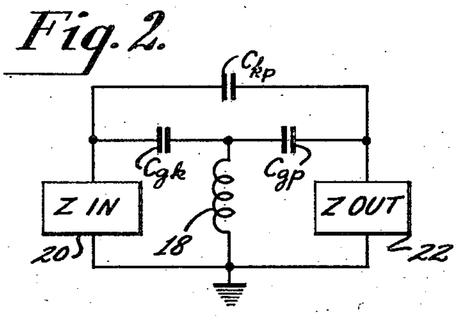
Figure 3:
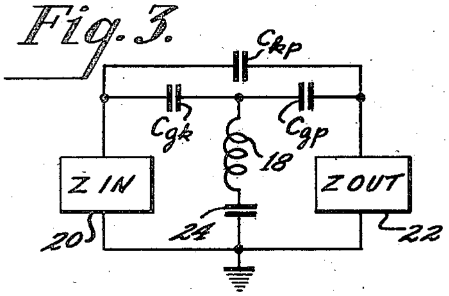
Figure 4:
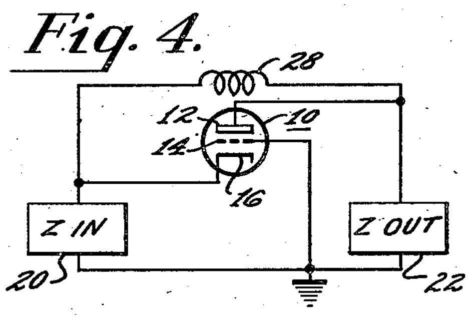
Figure 5:
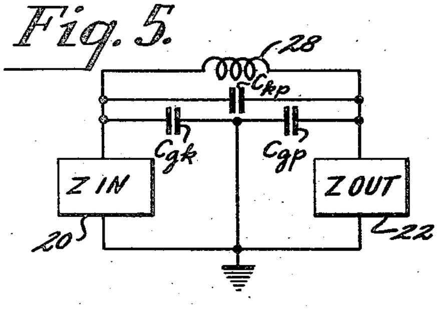
Figure 6:
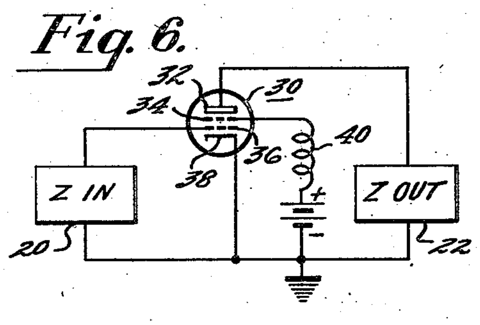
Figure 7:
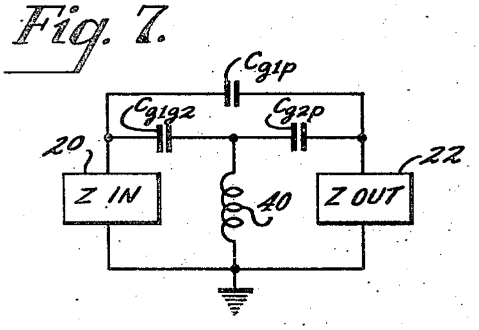
Figure 8:
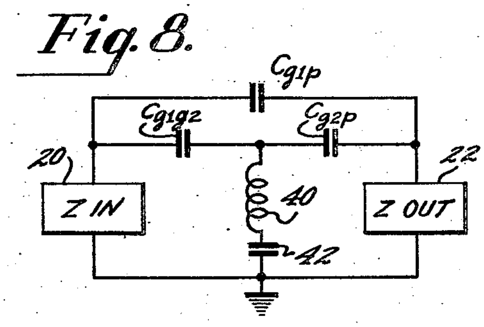
Figure 9:
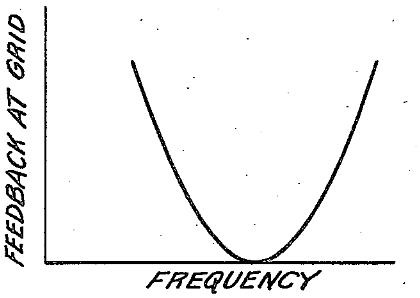
Figure 10:
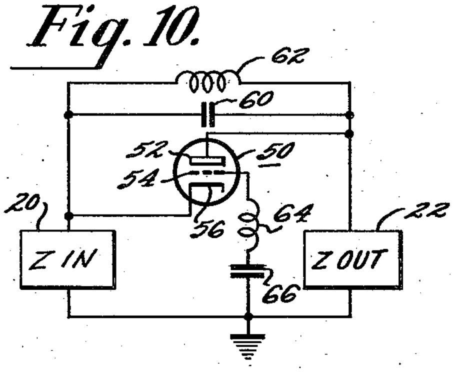
Figure 11:
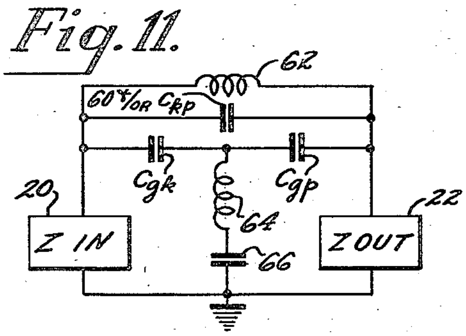
Figure 12:
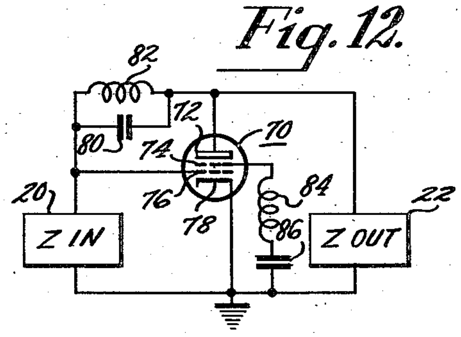
Figure 13:
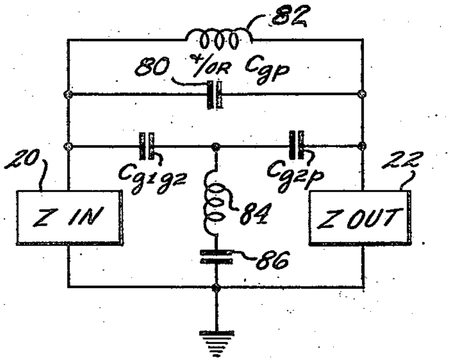
Figure 14:
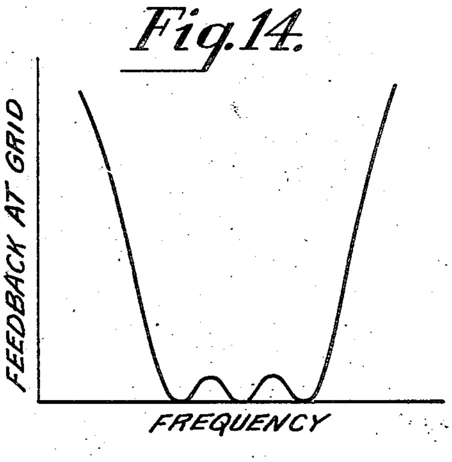

The novel features of the invention as well as the invention itself, both as to its organization and method of operation will best be understood from the following description when read in connection with the accompanying drawing, in which, Figure 1 is a circuit diagram showing a neutralization system for a grounded grid triode known to the art which is shown to provide a better understanding of my invention, Figure 2 is an impedance diagram for Figure 1, Figure 3 is an impedance diagram for Figure 1 showing a modification, Figure 4 is a circuit diagram showing another neutralization system for a grounded grid triode known to the art, Figure 5 is an impedance diagram for Figure 4, Figure 6 is a circuit diagram showing a neutralization system for a grounded cathode tetrode known to the art and also shown to provide a better understanding of my invention, Figure 7 is an impedance diagram for Figure 6, Figure 8 is an impedance diagram for Figure 6 showing a modification, Figure 9 is a graph of the feedback obtained at the grid versus frequency, for the prior art neutralization systems shown, Figure 10 is a circuit diagram of an embodiment of my invention showing a neutralization system for a grounded grid triode, Figure 11 is an impedance diagram of Figure 10, Figure 12 is a circuit diagram of an embodiment of my invention showing a neutralization system for a grounded cathode tetrode, Figure 13 is an impedance diagram for Figure 12, and Figure 14 is a graph of the feedback obtained at the grid versus frequency for the neutralization systems which are an embodiment of my invention.

Referring now to Fig. 1, there is seen a circuit diagram of a grounded grid triode amplifier 10 wherein the input is applied between the cathode 16 and ground, or other point of fixed reference potential, and the output is derived between the anode 12 and ground. An inductance 18 is provided for neutralization purposes between the grid 14 and ground. The input and output impedances are respectively represented by rectangles 20, 22. An impedance diagram of this circuit is shown in Fig. 2. Therein it may be seen that the circuit resembles a bridged T network and that, as a result, by adjusting the value of the inductance 18, no energy is transmitted by this bridged T network between the input and the output at one frequency. The grid-cathode capacitance $C_{gk}$ is in series with the grid-plate capacitance $C_{gp}$ and the cathode-plate capacitance $C_{kp}$ shunts the series-connected grid-cathode and grid-plate capacitance.

Fig. 3 is a modification of Fig. 2. A condenser 24 is shown inserted in series with the inductance 18 which is representatve of the inductance connected between the grid 14 and ground. This capacitance 24 is used when the inductance of the grid lead is excessive and therefore the bridged T network could not otherwise be properly tuned to prevent transfer of energy between the input and output of the system.

Fig. 4 is a circuit diagram of another known system for neutralizing a grounded grid triode 10 and in place of an inductance 18 in series with the grid lead, an inductance 28 is placed between the anode 12 and cathode 16 and the grid 14 is connected directly to ground.

Fig. 5 is an impedance diagram of Fig. 4. The interelectrode capacitances, namely, the grid-cathode and grid-plate capacitances, $C_{gk}$ and $C_{gp}$ respectively, which are in series, have their junction point grounded. The cathode-plate capacitance $C_{kp}$, together with the added inductance 28, shunts the series connected capacitances. The value of the inductance 28 is selected so that parallel resonance with the cathode-plate capacitance $C_{kp}$ is obtained and, as a result, a maximum impedance exists between the input and output circuits. This results in a minimum of energy being transferred at the frequency of resonance.

Fig. 6 shows a system of neutralization for a grounded cathode tetrode 30. As indicated, the cathode 38 of the tetrode tube 30 is grounded, the input impedance 20 exists between the control grid 36 of the tetrode and ground. Output is derived between the anode 32 of the tetrode and ground, and an inductance 40 is connected between the screen grid 34 and a screen bias potential source. This bias potential source is of course also connected to ground. The representative impedance diagram of Fig. 6 is shown in Fig. 7. Its resemblance to Fig. 2 should be apparent. The bridged T circuit results in view of the fact that the capacitance between the screen and control grid $C_{g1g2}$ is in series with the capacitance between the screen grid and plate $C_{g2p}$. The capacitance between the grid and plate $C_{g1p}$ shunts these two series connected capacitances and the added inductance 40, which includes the screen grid lead inductance, is connected between the junction of the two series capacitances $C_{g1g2}$, $C_{g2p}$ and ground. This bridged T network is tuned by means of the inductance 40 so that a minimum of energy is transferred between input and output circuits at the desired frequency of operation.

Fig. 8 shows the effect of adding a capacitance 42 in series with the inductance 40 for the purpose of reducing the effect of the inductance of the screen grid lead. Fig. 8 will be readily recognized as being substantially identical in appearance with Fig. 3.

Fig. 9 is a curve showing the feedback voltage appearing at the grid vs. the frequency. It will be seen that this feedback voltage is zero for a narrow band about the desired frequency of operation. As a result, variation of the frequency of operation for tuning purposes or or any other cause results in some feedback occurring and the amplifier becomes unstable or actually breaks into oscillation. In order to cure this defect, reference is made to Fig. 10 wherein there is shown the circuit diagram of an embodiment of the invention. It may there be seen that a grounded grid triode 50 has a condenser 60 and an inductance 62 connected in parallel between its cathode 56 and anode 52. This condenser 60 may be simply the cathode-plate capacitance of the triode. Also, an inductance 64 and a capacitance 66 are connected in series between the control grid 54 and ground, or other point of fixed reference potential. The input impedance 20 across which the input is applied exists between the cathode and ground and output impedance 22 across which an output is derived exists between the anode 52 and ground.

Fig. 11 shows the impedance diagram for Fig. 10. It may there be seen that, by the addition of the parallel capacitor 60 and inductance 62 between the input and output electrodes and the series capacitance 66 and inductance 64 connected to the control grid lead, the impedance diagram presents a band elimination filter between the input and output circuits. The capacitance 60 between the anode and cathode includes the plate-cathode capacitance $C_{kp}$, and the inductance 64 in series with the grid lead includes the grid lead inductance. The values of the series inductance 64 and capacitance 66 are selected so that the circuit is series resonant at the operating frequency. The values of the parallel inductance 62 and capacitance 60 are selected so that the circuit is parallel resonant at the operating frequency. A further limitation upon the values of the capacitance and inductance chosen is that the values of the parallel capacitor and inductance are further selected so that the surge impedance or LC ratio is a maximum. This results in a high impedance at a designated frequency below the frequency of operation. The series inductor and capacitor have their values selected to have an impedance at the designated frequency given by the relation $$Z_4 = \frac{Z_1 Z_2}{Z_3}$$

where:

$Z_4$=The impedance, at the designated frequency, of the series connected capacitor 66 and inductor 64, $Z_3$=The impedance, at the designated frequency, of the parallel connected capacitor 60 and inductance 62, $Z_1$=The impedance of the tube input interelectrode capacitance ($C_{gk}$ of Fig. 11) at the designated frequency, and $Z_2$=The impedance, at the designated frequency, of the tube output interelectrode capacitance ($C_{gp}$ of Fig. 11).

The above formula is obtained by evaluating the mesh equations for the circuit shown in Figure 11 for the condition when the transfer admittance between input and output is made equal to zero. When the values are so selected, the band rejection filter formed by the interelectrode capacitances together with the added elements will have three frequencies for which the coupling is zero and for which the coupling at intermediate frequencies is negligible between the input and output circuits. The three frequencies are: (1) the frequency selected at which the impedances are chosen, (2) the frequency of operation and (3) an image frequency which is above the frequency of operation by the same amount that the first frequency is below the frequency of operation.

Fig. 12 shows a circuit diagram for a tetrode 70 using a neutralization system in accordance with an embodiment of the invention. The input is presented across the input impedance 20 connected between the control grid 76 and cathode 78 of the tetrode 70. The ouput is derived from the output impedance 22 presented across the anode 72 and ground. There is a paralleled inductance 82 and capacitance 80 connected between the anode 72 and control grid 76 of the tetrode 70, and the screen grid 74 has its grid lead connected to an inductance 84 which is in series with a capacitance 86. This capacitance 86 is connected to ground.

The impedance diagram for Fig 12 is shown in Fig. 13. There it may be seen that a band elimination filter is also presented as a result of the interelectrode capacitances and the added circuit elements. The impedance diagram shown in Figure 13 is substantially identical with the one shown in Figure 11 and the same computations apply. The capacitance 80 which is added between the anode 72 and control grid 76 of the tetrode includes the grid-plate capacitance $C_{gp}$. It may also consist solely of the grid-plate capacitance $C_{gp}$ itself. Added inductance 84 and added capacitance are connected in series between ground and the junction between the control grid-to-screen grid interelectrode capacitance $C_{g1g2}$ and the screen grid-to-anode interelectrode capactance $C_{g2p}$. The inductance 84 includes the inductance of the screen grid lead.

Selection of the three points at which the band elimination filter will not permit a transfer of energy between the input and output is made by first selecting values of the parallel capacitance 80 and inductance 82 so that parallel resonance is obtained and then further selecting those values which present a high value of surge impedance. The values of the series connected inductance 84 and capacitance 86 are chosen to be series resonant at the frequency of operation as was shown, and to present an impedance, at a desired frequency below the frequency of operation, equal to the product of the input and output interelectrode reactances divided by the impedance of the parallel resonant circuit connected between input and output electrodes as shown in the previous formula. The desired frequency is the one at which a minimum transfer of energy between the input and output circuits is desired. The selection of component values is thus made in similar fashion to the selection of component values described for Figure 11. As a result, there will be zero transfer of energy at the selected point below the frequency of operation, at the frequency of operation, and at the image point above the frequency of operation. The energy transfer at intermediate points between these three points will be substantially negligible.

Fig. 14 is a curve of the feedback at the grid vs. the frequency and it can there be seen that neutralization is achieved over a broader band width than is achieved in the prior art systems. The three points at which zero feedback occurs are shown, and it may also be seen that at points intermediate these points the feedback is negligible. In an embodiment of the invention which was operated using a grounded grid triode, the prior art neutralization system permitted neutralization over a band width of only 20 Mc./S. at a center frequency of 200 Mc./S. Utilizing an embodiment of the invention, neutralization was achieved over a bandwidth in excess of 50 Mc./S. at the 200 Mc./S. operating point.

From the foregoing description, it should readily be apparent that there has been provided a novel neutralizing circuit and system wherein neutralization is obtained over a wider band of frequencies than has been possible heretofore.

What is claimed is:

1. An amplifier circuit neutralized over a wide band of frequencies of the type including an electron discharge device having input and output electrodes defining a space charge path and a grid electrode interposed between said input and said output electrodes and connected to a point of fixed potential, an output circuit connected between said output electrode and said point of fixed potential, an input circuit connected between said input electrode and said point of fixed potential, a network tuned to series resonance at the operating frequency connected between said grid electrode and said point of fixed potential, and a further network tuned to parallel resonance at said operating frequency connected between said input electrode and said output electrode, said further network having a high surge impedance value and a high impedance value at a frequency within said band and lower than said midband operating frequency, the first said network presenting an impedance equal to the product of the interelectrode impedance values of said electron discharge device between said input electrode and said grid electrode and between said grid electrode and said output electrode divided by the impedance value of said further network at a frequency higher than said midband operating frequency by an amount substantially equal to the difference between said lower and said midband operating frequencies.

2. A wide band neutralized grounded grid electrode amplifier circuit, including an electron discharge device having cathode and anode electrodes and at least one grid electrode interposed between said cathode and anode electrodes, an output circuit connected between said anode electrode and ground, an input circuit connected between an electrode other than said anode electrode and ground, a network tuned to series resonance at the midband operating frequency connected between said grid electrode and ground, and a further network tuned to parallel resonance at said midband operating frequency connected between that electrode connected to said input circuit and said anode electrode, said further network having a high surge impedance value and a high impedance value at a frequency within the band and lower than said midband operating frequency, the first said network presenting an impedance equal to the product of the interelectrode impedance values of said electron discharge device between said other electrode and said grid electrode and between said grid and anode electrodes divided by the impedance value of said further network at a frequency higher than said midband operating frequency by an amount substantially equal to the difference between said lower and said midband operating frequencies.

3. A wide band neturalized grounded grid amplifier circuit, including an electron discharge device having a cathode, an anode and a grid interposed between said cathode and said anode, an output circuit connected between said anode electrode and ground, an imput circuit connected between said cathode and ground, a network tuned to series resonance at the midband operating frequency connected between said grid and ground, and a further network tuned to parallel resonance at said midband operating frequency connected between said cathode and said anode, said further network having a high surge impedance value and a high impedance value at a frequency within the band and lower than said midband operating frequency, the first said network presenting an impedance equal to the product of the interelectrode impedance values of said electron discharge device between the cathode and grid and between the grid and anode divided by the impedance value of said further network at a frequency higher than said midband operating frequency by an amount substantially equal to the difference between said lower and said midband operating frequencies.

4. A wide band neutralized grounded grid amplifier circuit, including an electron discharge device having a cathode, an anode and control and screen grids interposed between said cathode and said anode, an output circuit connected between said anode electrode and ground, an imput circuit connected between said control grid and ground, a network tuned to series resonance at the midband operating frequency connected between said screen grid and ground, and a further network tuned to parallel resonance at said midband operating frequency connected between said control grid and said anode electrode, said further network having a high surge impedance value and a high impedance value at a frequency within the band and lower than said midband operating frequency, the first said network presenting an impedance equal to the product of the values of interelectrode impedance of said electron discharge device between the control and screen grids and between the screen grid and the anode divided by the value of impedance of said further network at a frequency higher than said midband operating frequency by an amount substantially equal to the difference between said lower and said midband operating frequencies.

5. A neutralizing circuit arrangement including an electron tube of the type having a plurality of electrodes among which there is interelectrode capacitance, an input circuit connected between one of said electrodes and a point of fixed reference potential, an output circuit connected between another of said electrodes and said point of fixed reference potential, inductance and capacitance elements connected in parallel between said input and output electrodes, said inductance and capacitance elements having values at which parallel resonance at the operating frequency and maximum surge impedance are provided to present a high value of impedance at a prearranged frequency below said operating frequency, at which a minimum interelectrode coupling is desired, and further inductance and capacitance elements connected in series between an electrode in said tube other than said last named electrodes and said point of fixed reference potential, said further inductance and capacitance elements having values at which series resonance at the operating frequency and an impedance, at said prearranged frequency below said operating frequency, equal to the product of the reactances of the input and output interelectrode capacitances of the multi-electrode tube divided by the impedance of the parallel connected inductance and capacitance elements are provided.

6. A neutralizing circuit arrangement for an electron tube of predetermined type, having a plurality of electrodes among which there is predetermined interelectrode capacitance, including an input circuit for connection between one of said electrodes and a point of fixed potential, an output circuit for connection between another of said electrodes and said point of fixed potential, inductance and capacitance elements connected in parallel between said input and output electrodes, said inductance and capacitance elements having values at which parallel resonance at the operating frequency and maximum surge impedance are provided to present a high value of impedance at a prearranged frequency below said operating frequency, at which a minimum interelectrode coupling is desired, and further inductance and capacitance elements connected in series between an electrode in said tube other than said last named electrodes and said point of fixed potential, said further inductance and capacitance elements having values at which series resonance at the operating frequency and an impedance, at said prearranged frequency below said operating frequency, equal to the product of the reactances of the input and output interelectrode capacitances of the multi-electrode tube divided by the impedance of the parallel connected inductance and capacitance elements are provided.

7. A neutralizing circuit arrangement including an electron tube of predetermined type having cathode, grid and anode electrodes among which there is predetermined interelectrode capacitance, an input circuit between said cathode electrode and a point of fixed reference potential, an output circuit between said anode electrode and said point of fixed reference potential, inductance and capacitance elements connected in parallel between said cathode and anode electrodes, said inductance and capacitance elements having values at which parallel resonance at the desired operating frequency and maximum surge impedance are provided to present a high value of impedance at a prearranged frequency below said operating frequency at which a minimum interelectrode coupling is desired, and further inductance and capacitance elements connected in series between said grid electrode and said point of fixed reference potential, said further inductance and capacitance elements having values at which series resonance at the operating frequency and an impedance, at said prearranged frequency, equal to the product of the reactances of the input and output interelectrode capacitances of said electron tube, divided by the impedance of the parallel connected inductance and capacitance elements are provided.

8. A neutralizing circuit arrangement including an electron tube of predetermined type having cathode, grid and anode electrodes among which there is predetermined interelectrode capacitance, an input circuit connected between said cathode electrode and ground, an output circuit connected between said anode electrode and ground, inductance and capacitance elements connected in parallel between said cathode and anode electrodes, said inductance and capacitance elements having values at which parallel resonance at the desired operating frequency and maximum surge impedance are provided to present a high value of impedance at a prearranged frequency below said operating frequency at which a minimum interelectrode coupling is desired, and further inductance and capacitance elements connected in series between said grid electrode and ground, said further inductance and capacitance elements having values at which series resonance at the operating frequency and an impedance, at said prearranged frequency equal to the product of the reactances of the input and output interelectrode capacitances of said electron tube divided by the impedance of the parallel connected inductance and capacitance elements are provided.

9. A neutralizing circuit arrangement for an electron tube of predetermined type having cathode, grid and anode electrodes among which there is predetermined interelectrode capacitance, including an input circuit for connection between said cathode electrode and a point of fixed reference potential, an output circuit for connection between said anode electrode and said point of fixed reference potential, inductance and capacitance elements in parallel for connection between said cathode and anode electrodes, said inductance and capacitance elements having values at which parallel resonance at the desired operating frequency and maximum surge impedance are provided to present a high value of impedance at a prearranged frequency below said operating freqeuncy at which a minimum interelectrode coupling is desired, and further inductance and capacitance elements connected in series for connection between said grid electrode and said point of fixed reference potential, said further inductance and capacitance elements having values at which series resonance at the operating frequency and an impedance, at said prearranged frequency, equal to the product of the reactances of the input and output interelectrode capacitances of said electron tube divided by the impedance of the parallel connected inductance and capacitance elements are provided.

10. A neutralizing circuit arrangement including an electron tube of predetermined type having cathode, control, screening and anode electrodes among which there is predetermined interelectrode capacitance, an input circuit connected between said control and cathode electrodes, an output circuit connected between said anode and cathode electrodes, inductance and capacitance elements connected in parallel between said control and anode electrodes, said inductance and capacitance elements having values at which parallel resonance at the operating frequency and maximum surge impedance are provided to present a high value of impedance at a prearranged frequency below said operating frequency at which a minimum interelectrode coupling is desired, and further inductance and capacitance elements connected in series between said screening electrode and said cathode electrode, said further inducance and capacitance elements having values at which series resonance at the operating frequency and an impedance, at said prearranged frequency equal to the product of the reactances of the input and output interelectrode capacitances of the multi-electrode tube divided by the impedance of the parallel connected inductance and capacitance elements are provided.

11. A neutralizing circuit arrangement for an electron tube of predetermined type having cathode, control, screening and anode electrodes among which there is predetermined interelectrode capacitance, including an input circuit for connection between said control and cathode electrodes, an output circuit for connection between said anode and cathode electrodes, inductance and capacitance elements connected in parallel for connection between said control and anode electrodes, said inductance and capacitance elements having values at which parallel resonance at the operating frequency and maximum surge impedance are provided to present a high value of impedance at a prearranged frequency below said operating frequency at which a minimum interelectrode coupling is desired, and further inductance and capacitance elements connected in series for connection between said screening electrode and said cathode electrode, said further inductance and capacitance elements having values at which series resonance at the operating frequency and an impedance, at said prearranged frequency, equal to the product of the reactances of the input and output interelectrode capacitances of the multi-electrode tube divided by the impedance of the parallel connected inductance and capacitance elements are provided.

References Cited in the file of this patent

UNITED STATES PATENTS

| Number | Name | Date |
|---|---|---|
| 2,093,094 | Peterson | Sept. 14, 1937 |
| 2,344,734 | Roberts | Mar. 21, 1944 |
| 2,431,333 | Labin | Nov. 25, 1947 |

OTHER REFERENCES

Valley et al. text, "Vacuum Tube Amplifiers," pages 646–649 and 661, pub. 1948 by McGraw-Hill Book Co., N. Y. Copy in Div. 69.

Terman text, "Radio Engineering," pp. 39, 46, 367–369, 373–374, pub. 1947 by McGraw-Hill Book Co., N. Y. Copy in Div. 69.